United States Patent [19]

Lomas

[11] Patent Number: 4,460,493

[45] Date of Patent: Jul. 17, 1984

[54] PROCESS TO CONTROL FOAMING IN NON-AQUEOUS SYSTEMS

[75] Inventor: Arnold W. Lomas, Midland, Mich.

[73] Assignee: Dow Corning Corporation, Midland, Mich.

[21] Appl. No.: 370,713

[22] Filed: Apr. 22, 1982

[51] Int. Cl.$^3$ ............................................. B01D 19/04
[52] U.S. Cl. .................................. 252/321; 252/78.3; 252/358
[58] Field of Search .............................. 252/321, 358

[56] References Cited

U.S. PATENT DOCUMENTS

| | | |
|---|---|---|
| 3,115,472 | 12/1963 | Currie ............................ 252/321 X |
| 3,250,727 | 5/1966 | Noll et al. ....................... 252/321 X |
| 3,784,479 | 1/1974 | Keil ................................. 252/321 X |
| 3,865,544 | 2/1975 | Keil ................................. 252/321 X |
| 4,082,690 | 4/1978 | Farminer ............................. 252/321 |
| 4,122,029 | 10/1978 | Gee et al. ....................... 252/321 X |

*Primary Examiner*—Richard D. Lovering
*Attorney, Agent, or Firm*—Andrew H. Ward

[57] ABSTRACT

A composition, used to control foaming in non-aqueous systems consisting essentially of (A) a foam control agent for non-aqueous systems that is not readily soluble in the non-aqueous systems, (B) a dispersing agent, and (C) a non-ionic surfactant having an HLB number greater than 10, is disclosed.

13 Claims, No Drawings

PROCESS TO CONTROL FOAMING IN NON-AQUEOUS SYSTEMS

FIELD OF THE INVENTION

This invention relates to a composition, used to control foaming in non-aqueous systems, consisting essentially of (A) a foam control agent for non-aqueous systems that is not readily soluble in the non-aqueous systems, (B) a dispersing agent, and (C) a non-ionic surfactant having an HLB number greater than 10. The composition may also contain a polar solvent, preferably water, and thus eliminate the cost of purchasing, storing, and shipping solvents.

DESCRIPTION OF THE PRIOR ART

Various kinds of foaming problems are encountered in non-aqueous systems. For example, severe foaming problems are often encountered in crude oils during separation of dissolved gases at the well-head. Certain crudes, notably deep offshore crudes, have been causing severe foaming problems which have been controlled by the use of excessive quantities of polydimethylsiloxane fluids per se. It has been customary in such operations to dilute the polydimethylsiloxane fluid in an oil fraction such as diesel fuel and meter the diluted material into the foaming process stream. In certain crudes and at high flow rates, it is difficult to obtain a thorough dispersion of the silicone at the low active concentrations used (1-20 parts per million), even with the aforementioned dilution technique.

Also, in the processing of various residual petroleum stocks into coke, a commonly used technique is the well-known delayed coking process. In the delayed coking process heavy residual oils are heated to about 500° C. by pumping them at high velocity through a pipe furnace and then charging these oils to an insulated coking drum. Details of this process are set forth in various places in the literature. The delayed coking process produces quantities of foam which is undesirable since it diminishes the efficient operation of the process. As with the crude oils mentioned above, to control the foam in the delayed coking process it has been customary to treat the stocks being processed with polydimethylsiloxane per se.

In recent years, huge oil discoveries in remote locations, such as the North Slope of Alaska and the North Sea, have resulted in increased use of silicones in crude oil production. A silicone antifoam is called a "critical chemical" on the North Slope, i.e. oil cannot be produced without silicones. Silicone antifoams are generally used at a level of 1 to 2 ppm in produced oil, but on the North Slope, 9 to 14 ppm is required.

U.S. Pat. No. 4,082,690 discloses a composition, for reducing and/or preventing foam in non-aqueous systems, consisting essentially of a polydimethylsiloxane fluid, a siloxane resin composed of $(CH_3)_3SiO_{\frac{1}{2}}$ units and $SiO_2$ units, and a hydrocarbon solvent. Though this foam control composition is effective in the North Slope, it cannot compete in the area of cost with the polydimethylsiloxane fluids per se.

It has been discovered in accordance with the present invention that a composition, consisting essentially of (A) a foam control for non-aqueous systems that is not readily soluble in the non-aqueous systems, (B) a dispersing agent, and (C) a non-ionic surfactant having an HLB number greater than 10, can prevent or reduce foam in non-aqueous systems better and more cost efficient than the present foam control agents for non-aqueous systems. The foam control composition of the present invention may also contain (D) a polar solvent. If water is used as (D) the polar solvent, it can also eliminate the use of hydrocarbon solvents.

It is thus an object of this invention to provide a composition that is effective and cost efficient for the purpose of controlling foam in non-aqueous systems. By way of further illustration, non-aqueous systems include various refinery processes such as crude units, vacuum units, vis breakers, delayed cokers, and asphalt processing; well-head operations such as gas-oil separation; and as additives such as in hydraulic oils and lubricating oils.

DETAILED DESCRIPTION

This invention relates to a composition, used to control foaming in non-aqueous systems, consisting essentially of (A) a foam.control agent for non-aqueous systems that is not readily soluble in the non-aqueous systems, (B) a dispersing agent, and (C) a non-ionic surfactant having an HLB number greater than 10. The composition may also contain a polar solvent, preferably water, and thus eliminate the cost of purchasing, storing, and shipping solvents.

Specifically, this invention relates to a composition used to control foaming in non-aqueous systems consisting essentially of (A) a foam control agent for non-aqueous systems that is not readily soluble in the non-aqueous systems;

(B) a dispersing agent selected from the group consisting of
  1. siloxane-organic copolymers consisting essentially of $SiO_2$ units, $(CH_3)_3SiO_{\frac{1}{2}}$ units and $D(CH_3)_2SiO_{\frac{1}{2}}$ units in which D is a polyoxyethylene polymer having a molecular weight of at least 500, or a polyoxyethylene-polyoxypropylene copolymer having a molecular weight of at least 500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{\frac{1}{2}}$ and $D(CH_3)_2SiO_{\frac{1}{2}}$ units being in the range of 1.0:0.4 to 1.0:1.2,
  2. copolymers which are reaction products derived from heating a mixture of a siloxane consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, and hydroxylated polyoxyethylene polymer having a molecular weight of at least 500 or a hydroxylated polyoxyethylene-polyoxypropylene copolymer having a molecular weight of at least 500 and the polyoxypropylene constitutes up to 50 mole percent of the organic portion of the copolymer,
  3. polydimethylsiloxane-organic copolymers in which the polydimethylsiloxane portion has a molecular weight of at least 1,400 and the organic portion consists essentially of a polyoxyethylene polymer having a molecular weight of at least 500, or a polyoxyethylene-polyoxypropylene copolymer having a molecular weight of at least 500 and the polyoxypropylene constitutes up to 50 mole percent of the organic portion of the copolymer, said organic portion being attached to silicon atoms via silicon-carbon bonds, and 4. polydimethylsiloxane-organic copolymers which are reaction products produced by heating a mixture of hydroxylated polydimethylsiloxanes having a molecular weight of at least 1,400, and a hydroxylated polyoxyethylene polymer having a molecular weight of at least 500, or a hydroxylated polyoxyethylene-polyoxypropylene copolymer having a molecular weight of at least 500 and the polyoxypropylene constitutes up to 50 mole percent of the organic portion of the copolymer, and, (C) a non-ionic surfactant having an HLB number greater than 10. The composition may also contain (D) a polar solvent if desired.

So far as is known at this time, the nature of Component (A) is not critical as long as it is a foam control agent for non-aqueous systems that is not readily soluble in the non-aqueous systems. It is preferred, however, that Component (A) have a high molecular weight, the higher, the better.

Specific examples of suitable foam control agents for non-aqueous systems include organics such as polypropylene glycols, and silicones such as polydimethylsiloxanes, poly(methyl-3,3,3-trifluoropropyl)siloxane, a mixture of polydimethylsiloxane and a poly(methyl-3,3,3-trifluoropropyl)siloxane, a mixture of polydimethylsiloxane and a siloxane resin consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, a mixture of poly(methyl-3,3,3-trifluoropropyl)siloxane and a siloxane resin consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, and a mixture of polydimethylsiloxane, poly(methyl-3,3,3-trifluoropropyl)siloxane, and a siloxane resin consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2. If the siloxane resin consisting essentially of $SiO_2$ units and $(CH_3)_3SiO_{\frac{1}{2}}$ units is present in the foam control agent, it is preferred that the foam control agent contain no more than 10 percent by weight of it.

It is preferred that Component (A) be a silicone foam control agent and be present in the composition in a range of 0.073 to 72.999 percent by weight. It is further preferred that it be present in a range of 18.25 to 54.75 percent by weight. However, if Component (A) is a fluorine containing foam control agent, it is preferred that it be present in a range of 0.05 to 72.99 percent by weight, with a further preference of 18.25 to 54.75 percent by weight.

It is preferred that Component (A) be a polydimethylsiloxane. It is further preferred that the polydimethylsiloxane have a molecular weight range of 10,000 to 3,000,000. It is optimal that the molecular weight range be 60,000 to 1,000,000.

Component (B) is a dispersing agent selected from the group consisting of 1. siloxane-organic copolymers consisting essentially of $SiO_2$ units, $(CH_3)_3SiO_{\frac{1}{2}}$ units and $D(CH_3)_2SiO_{\frac{1}{2}}$ units in which D is a polyoxyethylene polymer having a molecular weight of at least 500, or a polyoxyethylene-polyoxypropylene copolymer having a molecular weight of at least 500 and the polyoxypropylene portion constitutes up to 50 mole percent of the organic portion of the copolymer, said D being attached to the silicon atom via a silicon-carbon bond, the ratio of the $SiO_2$ units to the total $(CH_3)_3SiO_{\frac{1}{2}}$ and $D(CH_3)_2SiO_{\frac{1}{2}}$ units being in the range of 1.0:0.4 to 1.0:1.2.

2. copolymers which are reaction products derived from heating a mixture of a siloxane consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, and hydroxylated polyoxyethylene polymer having a molecular weight of at least 500 or a hydroxylated polyoxyethylene-polyoxypropylene copolymer having a molecular weight of at least 500 and the polyoxypropylene constitutes up to 50 mole percent of the organic portion of the copolymer, 3. polydimethylsiloxane-organic copolymers in which the polydimethylsiloxane portion has a molecular weight of at least 1,400 and the organic portion consists essentially of a polyoxyethylene polymer having a molecular weight of at least 500, or a polyoxyethylene-polyoxypropylene copolymer having a molecular weight of at least 500 and the polyoxypropylene constitutes up to 50 mole percent of the organic portion of the copolymer, said organic portion being attached to silicon atoms via silicon-carbon bonds, and 4. polydimethylsiloxane-organic copolymers which are reaction products produced by heating a mixture of hydroxylated polydimethylsiloxanes having a molecular weight of at least 1,400, and a hydroxylated polyoxyethylene polymer having a molecular weight of at least 500, or a hydroxylated polyoxyethylene-polyoxypropylene copolymer having a molecular weight of at least 500 and the polyoxypropylene constitutes up to 50 mole percent of the organic portion of the copolymer.

The dispersing agent allows Component (A) to be compatible in Components (C) and (D).

One silicone dispersing agent useful herein is a siloxane copolymer consisting essentially of $SiO_2$ units, $(CH_3)_3SiO_{\frac{1}{2}}$ units and $D(CH_3)_2SiO_{\frac{1}{2}}$ units in which D is a polyoxyethylene polymer having a molecular weight of at least 500 or a polyoxyethylene-polyoxypropylene copolymer having a molecular weight of at least 500 and the polyoxypropylene portion constitutes up to 50 mole percent of the copolymer, said D being attached to the silicon atom via a silicon-carbon bond, and the ratio of the $SiO_2$ units to the total $(CH_3)_3SiO_{\frac{1}{2}}$ and $D(CH_3)_2SiO_{\frac{1}{2}}$ units is in the range of 1:0.4 to 1:1.2. When the molecular weight of the polyoxyalkylene portion D falls below that specified above, the additive cannot be properly dispersed. When D is polyoxypropylene, the additive cannot be properly dispersed either.

A second silicone dispersing agent useful herein is a siloxane copolymer reaction product derived from heating a mixture of a siloxane consisting essentially of $SiO_2$ units, and $(CH_3)_3SiO_{\frac{1}{2}}$ units in which the ratio of the $SiO_2$ units to $(CH_3)_3SiO_{\frac{1}{2}}$ units is in the range of 1:0.4 to 1:1.2, and a hydroxylated polyoxyethylene polymer having a molecular weight of at least 500 or a hydroxylated polyoxyethylene-polyoxypropylene copolymer having a molecular weight of at least 500 and the polyoxypropylene portion constitutes up to 50 mole percent of the copolymer. It is believed that these dispersing agents differ from those described immediately above, in that, the polyoxyalkylene portion is attached to the silicon atom via a silicon to oxygen to carbon bond instead of a direct silicon to carbon bond. It is theorized that the reaction upon heating takes place between residual silanol known to exist in the siloxane and the hydroxyl groups in the polyoxyalkylene. Formation of the reaction product is facilitated by the use of a catalyst known to promote the silanol carbinol condensation reaction, examples of such catalysts are bases such as potassium hydroxide and metal salts such as stannous octoate. As noted above, molecular weight limitations are critical.

The third silicone dispersing agent useful in this invention is a polydimethylsiloxane-organic copolymer in which the polydimethylsiloxane portion has a molecular weight of at least 1,400 and the organic portion consists essentially of polyoxyethylene polymer having a molecular weight of at least 500 or a polyoxyethylene-polyoxypropylene copolymer having a molecular weight of at least 500 and the polyoxypropylene portion constitutes no more than 50 mole percent of organic portion of the copolymer, said organic portion being attached to silicon atoms via silicon-carbon bonds.

The final silicone dispersing agent useful herein is a siloxane-organic copolymer which is the reaction product produced by heating a mixture of hydroxylated polydimethylsiloxane having a molecular weight of at least 1,400 and a hydroxylated polyoxyethylene having a molecular weight of least 500 or a hydroxylated polyoxyethylene-polyoxypropylene copolymer having a molecular weight of at least 500 and the polyoxypropylene constitutes up to 50 mole percent of the organic portion of the copolymer.

The comments with regard to the criticality of the molecular weight limitations and preparation techniques set forth with regard to the first two dispersing agents above is believed equally applicable to the last two respective dispersing agents of this invention.

It is preferred that the dispersing agent, Component (B), be present in the composition in a range of 0.009 to 8.91 percent by weight. It is further preferred that it be present in a range of 2.23 to 6.68 percent by weight.

It is further preferred that the dispersing agent be the copolymers which are reaction products derived from heating a mixture of a siloxane consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, and a hydroxylated polyoxyethylene polymer having a molecular weight of at least 500 or a hydroxylated polyoxyethylene-polyoxypropylene copolymer having a molecular weight of at least 500 and the polyoxypropylene consitutes up to 50 mole percent of the organic portion of the copolymer. It is preferred that the dispersing agent consist of 1 part of the siloxane and 2 parts of a 75/25 hydroxylated polyoxyethylene-polyoxypropylene having a molecular weight of at least 6,000.

Component (C) is a non-ionic surfactant having an HLB number greater than 10. HLB stands for hydrophilic-lipophilic balance and represents the emulsification properties. Each emulsifier could be assigned a number (called the HLB number) representing the extent of which it would behave as an oil-soluble versus a water-soluble type of emulsifier. The HLB numbers run from 1 to about 30, the lower number representing extreme lipophilic properties and the higher numbers extreme hydrophilic properties. The HLB numbers of the emulsifiers are very roughly parallel to their solubility properties and also to their solubilizing power.

Specific examples of suitable non-ionic surfactants include polyoxyethylene octyl phenol containing 10 polyoxyethylene units, an alkyl ether of a polyoxyethylene polymer, an alkyl aryl ether of a polyoxyethylene polymer, a polyalkylene glycol ether of an alcohol, structures similar to that of alkyl or alkyl aryl ethers of polyoxyalkylene polymers, and polyethylene glycol ethers of a secondary alcohol. It is preferred that Component (C) be a polyalkylene glycol ether of an alcohol. It is further preferred that Component (C) be a polyethylene glycol ether of a secondary alcohol.

It is preferred that the composition contain between 0.018 and 18.09 percent by weight of the non-ionic surfactant having an HLB number greater than 10, Component (C). It is further preferred that the composition contain between 4.52 and 13.57 percent by weight of Component (C).

The foam control composition of the present invention may also contain (D) a polar solvent, if desired. So far as is known at this time the nature of the solvent is not critical as long as it is polar. Specific examples of suitable solvents include water; brine; short chain alcohols such as isopropanol, butanol, and pentanol; ketones such as methyl ethyl ketone and methyl isobutyl ketone; ethers such as methyl ether, n-propyl ether, and isopropyl ether; and glycols such as ethylene glycol and propylene glycol. It is preferred that the solvent be water due to cost efficiency.

It is preferred that the composition contain between 0.001 and 99.9 percent by weight of a polar solvent. It is further preferred that it contain between 25 and 75 percent by weight of Component (D).

As far as is know at this time, Components (A), (B), and (C) should be mixed first, followed by the addition and subsequent mixing of Component (D).

The components of this invention are well known articles of commerce available from numerous sources. Their preparations are well known to those skilled in the art and hence no such details are given here.

The composition of this invention may be introduced into the non-aqueous foaming systems at any suitable point of the processing using any of the well-known techniques. By way of further illustration, the composition can be used to break or kill an existing head of foam, be introduced into a system prior to the time foaming normally occurs to prevent foaming, or it can be used to both reduce and prevent foaming simultaneously.

The effective amount of the composition which is employed will depend on the particular system in which foam is to be controlled and the extent to which the user wishes to control the foam. While the composition of this invention can be used to control foam in a variety of non-aqueous systems exhibiting foam problems, such as refinery processes, well-head operations, and as additives, it is particularly designed for and useful in crude oil production in remote areas due to the use of water as a solvent and thus a savings in solvent and solvent transportation costs.

The composition of this invention can be used as any kind of foam control agent, i.e., as defoaming agents and/or antifoaming agents. Defoaming agents are generally considered as foam reducers whereas antifoaming agents are generally considered as foam preventors. As noted, the instant composition can serve in either or both capacities.

Now in order that those skilled in the art may better understand how the present invention can be practiced, the following examples are given by way of illustration and not by way of limitation. All parts and percents referred to herein are by weight, and all viscosities are measured at 25° C., unless otherwise specified.

EXAMPLE 1

A sparge test was used to qualitatively evaluate the defoaming and antifoaming efficiency of various foam control compositions. The non-aqueous system is sparged with nitrogen to produce foam. The "defoaming efficiency" of a foam control composition is evaluated by measuring its effect on the foam height and the foam collapse time after a specified sparging time. The "antifoaming efficiency" of a material is evaluated by measuring the rate of foam build up during an extended sparging period and the subsequent rate of foam collapse. The efficiencies of different materials in the same foaming system may be qualitatively compared; however, no correlation of efficiency of a specific material in various foaming solutions is possible.

The apparatus used for the sparge test consists of a glass gas dispersion tube attached to a 7 mm ID glass tube to give a total length of about 20 inches and supported by a rubber stopper so the bottom of tube, which has a gas dispersion stone attached, is $\frac{1}{2} \pm 1/16$ inch from the bottom of the graduated cylinder that holds the foaming solution.

The test procedure is as follows:
1. Thoroughly clean, and rinse with solvent, a 250 ml graduated cylinder.
2. Place $50 \pm 1$ ml of crude oil in the clean 250 ml graduated cylinder and heat the oil to 80° C.
3. Place 2 ppm of the foam control composition into the cylinder.
4. Place the dispersion tube in the cylinder and immediately start the nitrogen flow, having a flow rate of $500 \pm 50$ ml/min, and timer.
5. Measure foam height every 60 seconds for 5 minutes.
6. Stop the sparge and allow the cylinder to stand undisturbed.
7. Record the time, in seconds, when the foam has collapsed to expose a portion of clear surface. If the foam has not collapsed at the end of 5 minutes, record the height of the foam and discontinue the test.

The foam control compositions tested were as follows:

Comparison Compositions:

Composition A consists essentially of 1 percent by weight of a polydimethylsiloxane having a molecular weight of 75,000 and 99 percent by weight of diesel fuel.

Composition B consists essentially of 1 percent by weight of a polydimethylsiloxane gum having a molecular weight range of 400,000 to 500,000 and 99 percent by weight of diesel fuel.

Compositions of present invention:

Composition C consists essentially of 1 percent of weight of a polydimethylsiloxane fluid having a molecular weight of 75,000, 0.12 percent by weight of a dispersing agent consisting essentially of copolymers which are reaction products derived from heating a mixture of 1 part siloxane consisting essentially SiO$_2$ units and (CH$_3$)$_3$SiO$_{\frac{1}{2}}$ units in which the ratio of SiO$_2$ units to (CH$_3$)$_3$SiO$_{\frac{1}{2}}$ units is in the range of 1.0:0.4 to 1.0:1.2, and 2 parts of a hydroxylated polyoxyethylene polymer having a molecular weight of 9,000 or a hydroxylated polyoxyethylene-polyoxypropylene copolymer having a molecular weight of 9,000 and the polyoxypropylene constitutes up to 50 mole percent of the organic portion of the copolymer, 0.25 percent by weight of a non-ionic surfactant having an HLB number greater than 10, namely Tergitol 15 "S" 9 manufactured by Union Carbide Corporation, which is a polyethylene glycol ether of a secondary alcohol, and 98.63 percent by weight water.

Composition D consists essentially of 1 percent by weight of a polydimethylsiloxane gum having a molecular weight range of 400,000 to 500,000, 0.12 percent by weight of a dispersing agent consisting essentially of copolymers which are reaction products derived from heating a mixture of 1 part siloxane consisting essentially of SiO$_2$ units and (CH$_3$)$_3$SiO$_{\frac{1}{2}}$ units in which the ratio of SiO$_2$ units to (CH$_3$)$_3$SiO$_{\frac{1}{2}}$ units is in the range of 1.0:0.4 to 1.0:1.2, and 2 parts of a hydroxylated polyoxyethylene polymer having a molecular weight of 9,000 or a hydroxylated polyoxyethylene-polyoxypropylene copolymer having a molecular weight of 9,000 and the polyoxypropylene constitutes up to 50 mole percent of the organic portion of the copolymer, 0.25 percent by weight of a non-ionic surfactant having a HLB number greater than 10, namely Tergitol 15 "S" 9 manufactured by Union Carbide Corporation, which is a polyethylene glycol ether of a secondary alcohol, and 98.63 percent by weight water.

The results are as follows:

| Composition | 1 min | 2 min | 3 min | 4 min | 5 min | Break |
|---|---|---|---|---|---|---|
| Control* | 230 ml | 180 ml | 130 ml | 125 ml | 125 ml | 20 sec |
| A | 100 ml | 75 ml | 70 ml | 75 ml | 70 ml | 2 sec |
| B | 70 ml | 65 ml | 65 ml | 65 ml | 65 ml | 1 sec |
| C | 130 ml | 90 ml | 70 ml | 60 ml | 60 ml | 1 sec |
| D | 70 ml | 70 ml | 70 ml | 70 ml | 65 ml | 1 sec |

*0 ppm antifoam

The results of the compositions tested show that the compositions of the present invention are very good antifoams besides offering a considerable savings for the end user in that solvents do not have to be purchased, shipped to, or stored in any location where water is available. This could provide a significant advantage as offshore platform space is now extremely expensive.

That which is claimed:

1. A process to control foaming in non-aqueous systems, said process comprising adding to a non-aqueous system an effective amount of a composition consisting essentially of:
    (A) from 0.005 to 72.99 percent by weight of a foam control agent for non-aqueous systems that is not readily soluble in the non-aqueous system, said agent selected from the group consisting of
        (1) polydimethylsiloxane;
        (2) poly(methyl-3,3,3-trifluoropropyl)siloxane;
        (3) mixtures of (1) and (2);
        (4) a major portion of (1), (2) or (3) above and a minor portion of a siloxane resin consisting essentially of SiO$_2$ units and (CH$_3$)$_3$SiO$_{\frac{1}{2}}$ units in which the ratio of SiO$_2$ units to (CH$_3$)$_3$SiO$_{\frac{1}{2}}$ units is in the range of 1.0:0.4 to 1.0:1.2;
    (B) from 0.009 to 8.91 percent by weight of a dispersing agent selected from the group consisting of
        (1) siloxane-organic copolymers consisting essentially of SiO$_2$ units, (CH$_3$)$_3$SiO$_{\frac{1}{2}}$ units and D(CH$_3$)$_2$SiO$_{\frac{1}{2}}$ units in which D is a polyoxyethylene polymer having a molecular weight of at least 500, or a polyoxyethylene-polyoxypropylene copolymer having a molecular weight of at least 500 and the polyoxypropylene portion constitutes up to 50 mole percent of the organic portion of the copolymer, said D being attached to a silicon atom via a silicon-carbon bond, the ratio of $SiO_2$ units to the total $(CH_3)_3SiO_{\frac{1}{2}}$ and $D(CH_3)_2SiO_{\frac{1}{2}}$ units being in the range of 1.0:0.4 to 1.0:1.2, (2) copolymers which are reaction products derived from heating a mixture of a siloxane consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, and a hydroxylated polyoxyethylene polymer having a molecular weight of at least 500 or a hydroxylated polyoxyethylene-polyoxypropylene copolymer having a molecular weight of at least 500 and the polyoxypropylene constitutes up to 500 mole percent of the organic portion of the copolymer.

(3) polydimethylsiloxane-organic copolymers in which the polydimethylsiloxane portion has a molecular weight of at least 1,400 and the organic portion consists essentially of a polyoxyethylene polymer having a molecular weight of at least 500, or a polyoxyethylene-polyoxypropylene copolymer having a molecular weight of at least 500 and the polyoxypropylene constitutes up to 50 mole percent of the organic portion of the copolymer, said organic portion being attached to a silicon atom via silicon-carbon bonds, and (4) polydimethylsiloxane-organic copolymers which are reaction products produced by heating a mixture of hydroxylated polydimethylsiloxanes having a molecular weight of at least 1,400, and a hydroxylated polyoxyethylene polymer having a molecular weight of at least 500, or a hydroxylated polyoxyethylene-polyoxypropylene copolymer having a molecular weight of at least 500 and the polyoxypropylene constitutes up to 50 mole percent of the organic portion of the copolymer, and (C) from 0.018 to 18.09 percent of a non-ionic surfactant having an HLB number greater than 10.

2. A process to control foaming as defined in claim 1 wherein the composition further contains (D) from 0.001 to 99.9 percent by weight of a polar solvent.

3. A process to control foaming as defined in claim 2 wherein Component (B) consists essentially of copolymers which are reaction products derived from heating a mixture of a siloxane consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, and hydroxylated polyoxyethylene polymer having a molecular weight of at least 500 or a hydroxylated polyoxyethylene-polyoxypropylene copolymer having a molecular weight of at least 500 and the polyoxypropylene constitutes up to 50 mole percent of the organic portion of the copolymer, Component (C) is a polyalkylene glycol ether of an alcohol, and Component (D) is water.

4. A process to control foaming as defined in claim 3 wherein Component (A) is a polydimethylsiloxane.

5. A process to control foaming as defined in claim 4 wherein the polydimethylsiloxane has a molecular weight range of 10,000 to 3,000,000.

6. A process to control foaming as defined in claim 5 wherein Component (A) is a polydimethylsiloxane having a molecular weight range of 60,000 to 1,000,000, Component (B) is a dispersing agent consisting essentially of copolymers which are reaction products derived from heating a mixture of 1 part siloxane consisting essentially of $SiO_2$ units and $(CH_3)_3SiO_{\frac{1}{2}}$ units in which the ratio of $SiO_2$ units to $(CH_3)_3SiO_{\frac{1}{2}}$ units is in the range of 1.0:0.4 to 1.0:1.2, and 2 parts of a 75/25 hydroxylated polyoxyethylene-polyoxypropylene copolymer having a molecular weight of at least 6,000 and Component (C) is a polyethylene glycol ether of a secondary alcohol.

7. A process to control foaming as defined in claim 6 wherein the composition consists essentially of 18.25 to 54.75 percent by weight of Component (A), 2.23 to 6.68 percent by weight of Component (B), 4.52 to 13.57 percent by weight of Component (C), and 25 to 75 percent by weight of Component (D).

8. A process to control foaming as defined in claim 3 wherein Component (A) is a poly(methy-3,3,3-trifluoropropyl)siloxane.

9. A process to control foaming as defined in claim 8 wherein the composition consists essentially of 18.25 to 54.75 percent by weight of Component (A), 2.23 to 6.68 percent by weight of Component (B), 4.52 to 13.57 percent by weight of Component (C) and 25 to 75 percent by weight of Component (D).

10. A process to control foaming as defined in claim 3 wherein Component (A) is a mixture of polydimethylsiloxane and poly(methyl-3,3,3-trifluoropropyl)siloxane.

11. A process to control foaming as defined in claim 3 wherein Component (A) consists essentially of 90 to 99.99 percent by weight of a mixture of polydimethylsiloxane and poly(methyl-3,3,3-trifluoropropyl)siloxane, and 0.01 and 10 percent by weight of a siloxane resin consisting essentially of $SiO_2$ units and $(CH_3)_3SiO_{\frac{1}{2}}$ units in which the ratio $SiO_2$ units to $(CH_3)_3SiO_{\frac{1}{2}}$ units is in the range of 1.0:0.4 to 1.0:1.2.

12. A process to control foaming as defined in claim 11 wherein the composition consists essentially of 18.25 to 54.75 percent by weight of Component (A), 2.23 to 6.68 percent by weight of Component (B), 4.52 to 13.57 percent by weight of Component (C), and 25 to 75 percent by weight of Component (D).

13. A process to control foaming as defined in claims 1, 2, 3, 4, 5, 6, 7, 8, 10, 9, 11, or 12 wherein the non-aqueous system is crude oil.

* * * * *

UNITED STATES PATENT AND TRADEMARK OFFICE
CERTIFICATE OF CORRECTION

PATENT NO. : 4,460,493
DATED : July 17, 1984
INVENTOR(S) : Arnold W. Lomas

It is certified that error appears in the above-identified patent and that said Letters Patent is hereby corrected as shown below:

In column 9, line 20, "500" should read --- 50 ---.

In column 10, line 46, "0.01 and 10" should read
---0.01 to 10---.

Signed and Sealed this

Sixteenth Day of April 1985

[SEAL]

Attest:

DONALD J. QUIGG

Attesting Officer     Acting Commissioner of Patents and Trademarks